United States Patent [19]

Ng

[11] Patent Number: 5,138,337

[45] Date of Patent: Aug. 11, 1992

[54] APPARATUS FOR GREY LEVEL PRINTING USING A BINARY ARCHITECTURED PRINTHEAD

[75] Inventor: Yee S. Ng, Fairport, N.Y.

[73] Assignee: Eastman Kodak Company, Rochester, N.Y.

[21] Appl. No.: 521,511

[22] Filed: May 10, 1990

[51] Int. Cl.$^5$ .................... G01D 9/42; H04N 1/21
[52] U.S. Cl. ........................ 346/107 R; 358/298
[58] Field of Search .......... 346/107 R, 154, 76 PH, 346/108, 107 A; 364/519; 358/298, 302

[56] References Cited

U.S. PATENT DOCUMENTS

| | | | |
|---|---|---|---|
| 4,074,320 | 2/1978 | Kapes et al. | |
| 4,525,729 | 6/1985 | Agulnek et al. | 346/107 R X |
| 4,630,068 | 12/1986 | Ims | 346/76 PH |
| 4,750,010 | 6/1988 | Ayers et al. | 346/107 R |
| 4,779,102 | 10/1988 | Sasaki | 346/76 PH |
| 4,806,950 | 2/1989 | Sekine et al. | 346/76 PH |
| 4,835,551 | 5/1989 | Ng . | |

Primary Examiner—Benjamin R. Fuller
Assistant Examiner—David Yockey
Attorney, Agent, or Firm—Norman Rushefsky

[57] ABSTRACT

A binary architectured LED printhead is driven in accordance with a multiple addressable, i.e., multiple sub-lines of recording, scheme to record grey level pixels. Respective sub-lines are recorded using a series of pulses that form a set of binary-weighted exposure strobe durations. Exposure durations for recording successive strobed sub-lines with a particular LED are ordered so that larger duration strobe pulses are followed by shorter duration strobe pulses. A plurality of strobe enable lines are provided to which respective recording elements are connected. A pulse from this set is generated during a sub-line exposure period on each enable line with each enable line having a pulse generated thereon that is of a different duration than that generated on the other enabling lines during the sub-line recording period and wherein during a sub-line exposure period the respective pulses on the enabling lines are substantially nonconcurrent.

8 Claims, 4 Drawing Sheets

APPARATUS FOR GREY LEVEL PRINTING USING A BINARY ARCHITECTURED PRINTHEAD

BACKGROUND OF THE INVENTION

1. Field of the Invention

The present invention relates to non-impact printing apparatus for recording using printheads having a plurality of recording elements such as a light-emitting diodes (LEDs) or the like.

2. Brief Description of the Prior Art

In order to reduce the cost of non-impact printheads such as LED printheads, modifications have been proposed to the design of the printheads to reduce the thermal load and current supply requirements of the printhead. In reducing the thermal load on a printhead, savings ensue by reducing the need for more expensive heat sinks and problems associated with nonuniformities in light emissions due to thermal gradients on the printhead may be avoided or reduced. Reduction in current supply requirements reduce the cost of the power supply as well as printhead electrical interconnects. In accordance with one such design a binary architectured printhead is provided with separate enable lines so that different segments of LED's may be enabled at different times during a time period for recording a line of pixels (picture elements). In this printhead all the LED's are arranged in a single straight line across the printhead. A line time for recording a row of pixels in a main scanning direction for a typical use with a photoconductive recording element is approximately 1400 microseconds (μs) (see FIGS. 1a–1d) for an eight-page per minute printer. As noted in FIGS. 1a–1d, the LED's to be enabled for recording during a particular line period are enabled in staggered fashion so that substantially no overlap results in enabling time. In FIGS. 1a–1d, the exposure timing is shown for an LED printhead of 300 dots per inch (dpi) which uses four independent enable lines for four printhead segments of LED's. As the requirement for exposure time per line at 300 dpi in this case is only 200 μs (with a system requiring 3 milliamps per pixel) and the line time for each 1/300th of an inch line spacing is as noted above 1400 μs one can spread out the four strobe enable pulses to have 200 μs exposure durations for each segment without overlapping the exposure times. This concept then reduces the current supply requirement for the printhead.

It is also known to use binary architectured printheads for grey scale recording. In grey scale recording, pixels are created of different densities whereas in binary recording, a pixel is either created or not created. In a binary architectured printhead as the term is used herein, data for determining whether or not a recording element is turned on or off for its next enablement period is determined by a single image data bit. Compare this with a grey level printer architecture, an example of which is illustrated in U.S. Pat. No. 4,750,010, (FIG. 6 thereof) wherein multiple lines for carrying data are required for each LED and multiple data bits are stored on the printhead for each LED before enabling the LED for its next enablement period. One reason for using a binary architectured printhead for grey level recording is that such printers have less data lines and registers for storing data and thus require fewer bonding pads and thereby are cost efficient to manufacture. Additionally, there is demand for such printheads by those incorporating same for use in binary printing applications as well as grey level printing applications, so manufacturing efficiencies based on production quantities may be passed along from the manufacturer of the printhead to the manufacturer of a printer incorporating this printhead. Ultimately, these savings can be passed along to purchasers of the printers.

An example of a binary architectured printhead that is used for grey level recording is described in U.S. Pat. No. 4,525,729. As taught in this patent, a multibit binary-weighted digital word representing a grey level pixel to be printed is shifted to a printhead one bit at a time so that a single bit for each LED is stored on the printhead just prior to enablement of the LED. An exposure clock signal enables those LED's having a respective data bit for a time period related to the binary weight of that data bit. As successive bits are shifted to the printhead, the time durations of the clock pulses changes accordingly until the pixel is printed in accordance with the appropriate digital word representing the pixel's grey level value. Where a pixel is represented by a six-bit digital word, six time periods of exposure are possible and 63 levels of grey, including white, are realizable.

One problem associated with the use of binary architectured printheads for grey level recording is that during recording of the most significant data bit the printhead is drawing considerable current for a relatively lengthy duration thereby causing thermal gradients to arise on the printhead as not all LED's are enabled during every sub-line of recording. The use of staggering, as taught for the embodiment of FIGS. 1a–1d is impractical, as the sub-line used for recording the most significant bit would be too long during recording of the pixels in sub-lines as the image recording medium is moving.

It is therefore an object of the invention to provide for a grey level printer apparatus employing a binary architectured printhead wherein the problems of thermal loading are minimized and exposure periods made relatively shorter than suggested by the prior art.

SUMMARY OF THE INVENTION

The above and other objects which will become apparent in reading the specification below are realized by a non-impact recording apparatus comprising:
  a binary architectured printhead including
  a) a plurality of recording elements;
  b) a respective register means associated with each recording element for storing a single image data bit and cooperating in activating the respective recording element for a predetermined enablement time as determined by a strobe pulse;
  c) means including a plurality of independent enable lines for carrying a plurality of strobe timing pulses;
  d) an enabling means for enabling a recording element in response to a data bit stored in the respective register means and to a strobe timing pulse;
  e) means coupling a respective recording element to a respective enable line;
  driving means for driving said binary architectured printhead to record grey level pixels using plural sub-lines to record each grey level pixel; said driving means including
    a) means for generating a new set of sub-line binary data signals for each sub-line of recording and for conveying such signals to the printhead for storing in said respective register means; and b) means for generating on each enable line a repeating series of strobe timing pulses, the series of pulses being a set of pulses of different durations for use in recording a grey level pixel, a pulse from the set being generated during a sub-line exposure period on each enable line and each enable line having a pulse from said set generated thereon that is a different duration than that generated on the other enabling lines during said sub-line recording period and wherein during a sub-line exposure period the respective pulses on the enabling lines are substantially nonconcurrent.

In accordance with another aspect of the invention, a non-impact recording apparatus comprises: a binary architectured printhead including (a) a plurality of recording elements, each for recording a pixel;

(b) a respective register means associated with each recording element for storing a single image data bit and cooperating in activating the respective recording element for a predetermined enablement time as determined by a strobe pulse;

(c) means for carrying a plurality of strobe timing pulses;

(d) an enabling means for enabling a recording element in response to a data bit stored in the respective register means and one of said strobe timing pulses;

(e) means coupling a respective recording element to said enabling means;

driving means for driving said binary architectured printhead to record grey level pixels using plural sub-lines to record each grey level pixel; said driving means including a) means for generating a new set of sub-line binary data signals for each sub-line of recording and for conveying such signals to the printhead for storing in said respective register means; and b) means for generating a repeating series of substantially binary weighted in time strobe timing pulses, the pulses in the set being arranged in time so that the longer duration strobe timing pulses of said set are directly followed by shorter duration strobe timing pulses of said set.

In accordance with still another aspect of the invention, a non-impact recording apparatus comprises:

a) a plurality of recording elements arranged in a single row with odd and even-numbered recording elements alternating in the row;

b) means for providing image data signals for use in enabling a recording element to record;

c) control means for providing strobe signals for use in enabling the recording elements to record for predetermined periods of time;

d) logic means for combining an image data signal and a strobe signal for causing a recording element to be enabled for recording; and e) characterized in that the control means, during recording of a line provides strobe signals for the odd and even-numbered elements at different times so as to substantially not overlap in time.

BRIEF DESCRIPTION OF THE DRAWINGS

FIGS. 4a–4d are timing diagrams illustrating strobe pulse signals on the binary architectured printhead of FIG. 3 but illustrating operation as a grey level printer during eight sub-lines of recording and being in accordance with the teachings of the invention.

DESCRIPTION OF THE PREFERRED APPARATUS

The apparatus of the preferred embodiment will be described in accordance with an electrophotographic recording medium. The invention, however, is not limited to apparatus for creating images on such a medium, as other media such as photographic film, thermal sensitive, etc., may also be used with the invention.

DETAILED DESCRIPTION OF THE PREFERRED EMBODIMENTS

Because electrophotographic reproduction apparatus are well known, the present description will be directed in particular to elements forming part of, or cooperating more directly with, the present invention. Apparatus not specifically shown or described herein are selectable from those known in the prior art.

Figure 1:
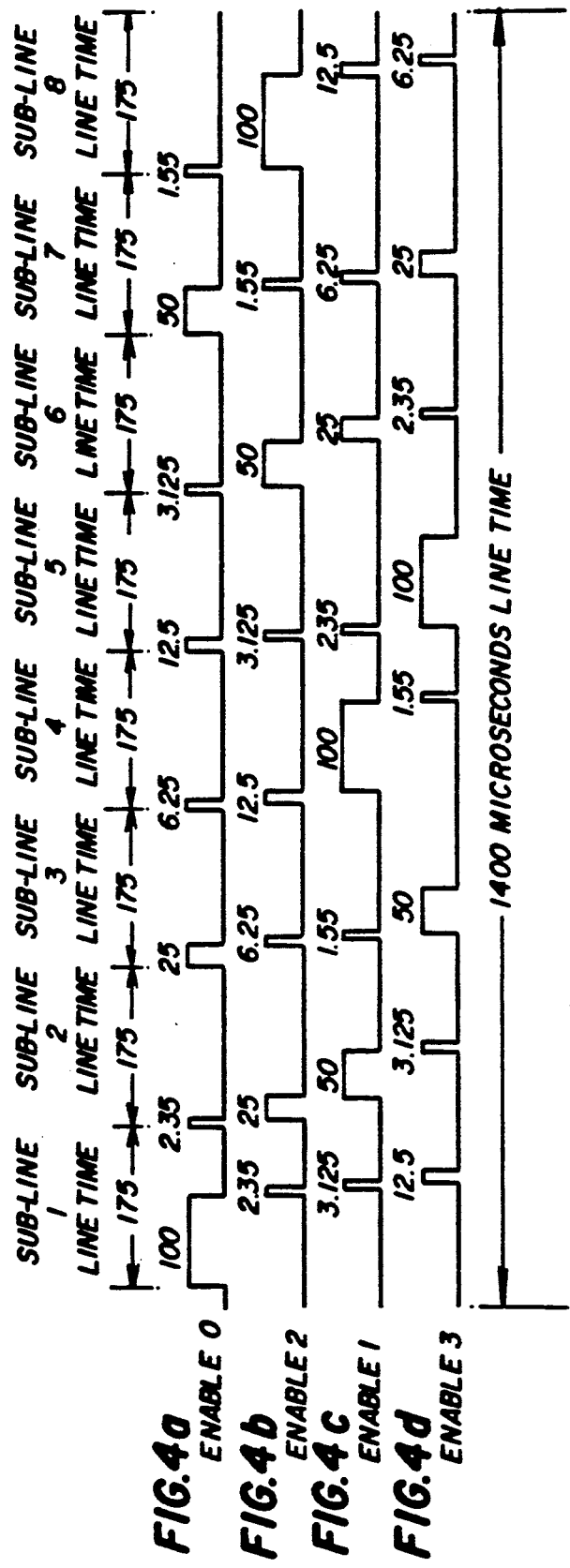
FIGS. 1a–1d are timing diagrams illustrating strobe pulse signals on a binary architectured printhead of the prior art operating as a binary printer and during a sub-line of recording.
Figure 2:
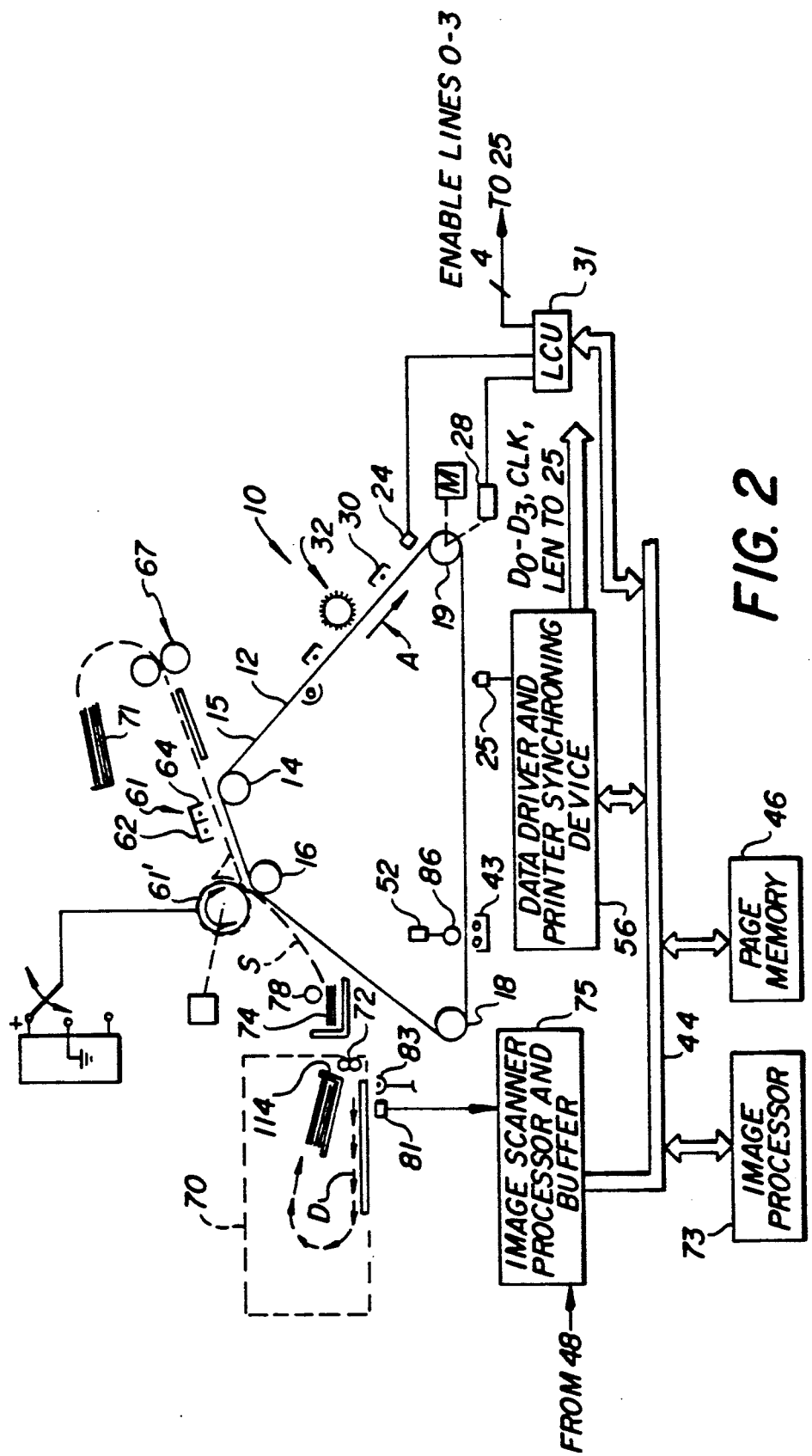
FIG. 2 is a schematic of a grey level printer apparatus made in accordance with the invention.

With reference now to FIG. 2, an electrophotographic reproduction apparatus 10 includes a recording medium or photoreceptor such as a photoconductive web 12 or other photosensitive medium that is trained about four transport rollers 14, 16, 18 and 19, thereby forming an endless or continuous web. Roller 19 is coupled to a driver motor M in a conventional manner. Motor M is connected to a source of potential when a switch (not shown) is closed by a logic and control unit (LCU) 31. When the switch is closed, the roller 19 is driven by the motor M and moves the web 12 in a clockwise direction as indicated by arrow A. This movement causes successive image areas or image frames of the web 12 to sequentially pass a series of conventional electrophotographic work stations of the reproduction apparatus.

For the purposes of this disclosure, several work stations are shown along the web's path. These stations will be briefly described.

First, a charging station 30 is provided at which the photoconductive surface 15 of the web 12 is sensitized by applying to such surface a uniform electrostatic primary charge of a predetermined voltage. The output of the charger may be controlled by a grid connected to a programmable power supply (not shown). The supply is, in turn, controlled by the LCU 31 to adjust the voltage level Vo applied onto the surface 15 by the charger 30.

At an exposure station an electrostatic image is formed by modulating the primary charge on an image area of the photoconductive surface with selective energization of point-like radiation sources in accordance with signals provided by a data source to be described. The point-like radiation sources are supported in a printhead 25 also to be described in more detail below.

A development station 43 includes developer which may consist of iron carrier particles and electroscopic toner particles with an electrostatic charge opposite to that of the latent electrostatic image. Developer is brushed over the photoconductive surface of the web 12 and toner particles adhere to the latent electrostatic image to form a visible toner particle, transferable image. The development station may be of the magnetic brush type with one or two rollers. Alternatively, the toner particles may have a charge of the same polarity as that of the latent electrostatic image and develop the image in accordance with known reversal development techniques.

The apparatus 10 also includes a transfer station 61 shown with a pair of corona chargers 62, 64 at which the toner image on web 12 is transferred in register to a copy sheet S; and a cleaning station 32, at which the photoconductive surface of the web 12 is cleaned of any residual toner particles remaining after the toner images have been transferred. After the transfer of the unfixed toner images to a copy sheet S, such sheet is transported to a heated pressure roller fuser 67 where the image is fixed to the copy sheet S and the sheet is then transported to a tray 71. Suitable means such as a transfer drum 61' may be provided for duplex operation in accordance with known techniques.

As shown in FIG. 2, a copy sheet S is fed from a supply 74 by driver roller 78, which then urges the sheet to move forward onto the web 12 in alignment with a toner image.

To coordinate operation of the various work stations with movement of the image areas on the web 12 past these stations, the web has a plurality of indicia such as perforations along one of its edges. These perforations generally are spaced equidistantly along the edge of the web 12. At a fixed location along the path of web movement, there is provided suitable encoding means 24 for sensing web perforations. This sensing produces input signals into the LCU 31 which has a digital computer, preferably one or more microprocessors. The LCU has a stored program responsive to the input signals for sequentially actuating, then de-actuating, the work stations as well as for controlling the operation of many other machine functions. Additional encoding means 28 may be provided as known in the art for providing more precise timing signals for control of the various functions of the apparatus 10 as will be described below.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor(s).

Figure 3:
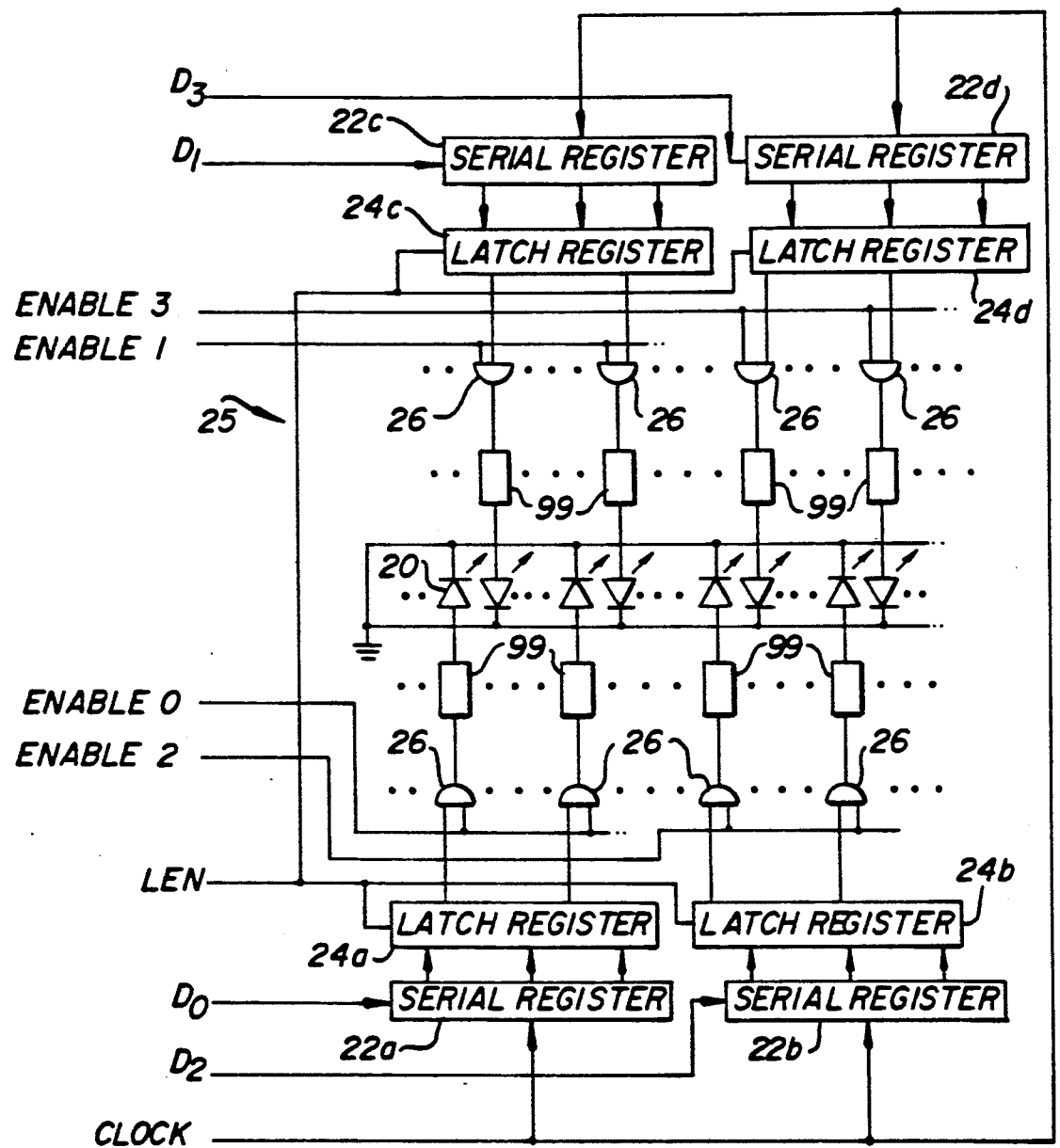
FIG. 3 is a block diagram of circuitry of a binary architectured printhead of the prior art and used in the printer apparatus of FIG. 2.

With reference to both FIGS. 2 and 3, the printhead 25, as noted, is provided with a multiplicity of energizable point-like radiation sources 20, preferably light-emitting diodes (LED's). Optical means (not shown) may be provided for focusing light from each of the LED's onto the photoconductive surface. The optical means preferably comprises an array of optical fibers such as sold under the name Selfoc, a trademark for a gradient index lens array sold by Nippon Sheet Glass, Limited. Due to the focusing power of the optical means, a row of emitters will be imaged on a respective transverse line on the recording medium.

With reference to FIG. 3, the printhead 25 comprises a suitable stationary support with a series of LED chip arrays mounted thereon. As is well known, each of the LED chip arrays includes, for example, 128 LED's arranged in a single row. These chips are also arranged end-to-end in a row and where thirty-eight LED chip arrays are so arranged, the printhead will extend across the width of the web 12 and include 4864 LED's arranged in a single row. To each side of this row of LED's there may be provided, for example, thirty-eight identical driver chips. Each of these driver chips include circuitry for addressing the logic associated with each of 64 LED's to control whether or not each of the LED's should be energized as well as current driver circuitry 99 to control the level of current to each of the LED's controlled by that driver chip. Two driver chips are thus associated with each LED chip array. Each of the two driver chips will be coupled for driving of alternate LED's, i.e., one of the driver chips will drive the even numbered LED's and the other driver chip will drive the odd numbered LED's in a particular LED chip array. Thus, one driver chip will drive the 64 odd numbered LED's of the 128 LED's in the array and the other driver chip will drive the 64 even numbered LED's of these 128 LED's. Only some of the LED's are illustrated in FIG. 3, it being understood that many more LED's are present. The driver chips on each side of the printhead are suitably coupled together in groups to serially shift data between those in a group. Thus, shift register 22a represents the combination of the shift registers in 19 driver chips.

As may be noted in FIG. 2, the original document sheet D forms a part of a multisheet document supported in a recirculating feeder tray 70. A vacuum drive roller (not shown) under control of the LCU feeds the document D face down through metering rollers 72 which are adapted to feed the document D past an image scanning head 81 formed of say a conventional CCD array and provide signals to a conventional image scanner processor and buffer indicative of the movement of the sheet. A lamp 83 provides a narrow line of illumination, upon the document D and reflections thereof off the document D are sensed by the image scanning array to provide signals indicative of density information thereon. This output of the image scanner array is fed to the image scanner processor and buffer 75.

The data representing the scanned image on document D are fed over bus 44 to an image processor 73. The image processor processes this data and formats same in accordance with well known techniques and the output thereof is fed over to a page memory 46 wherein a page of rasterized data to be printed is stored. The apparatus may also include a raster image processor that rasterizes data from a computer.

In response to pulses from encoders 24 and 28 identifying a new image frame on a photosensitive web, the LCU provides an output signal to the Page Memory to remove one line of data. This data is fed to an output device for formatting the data and synchronizing the operation thereof. This output device is illustrated by the data driver and printer synchronizing device 56.

Figure 5:
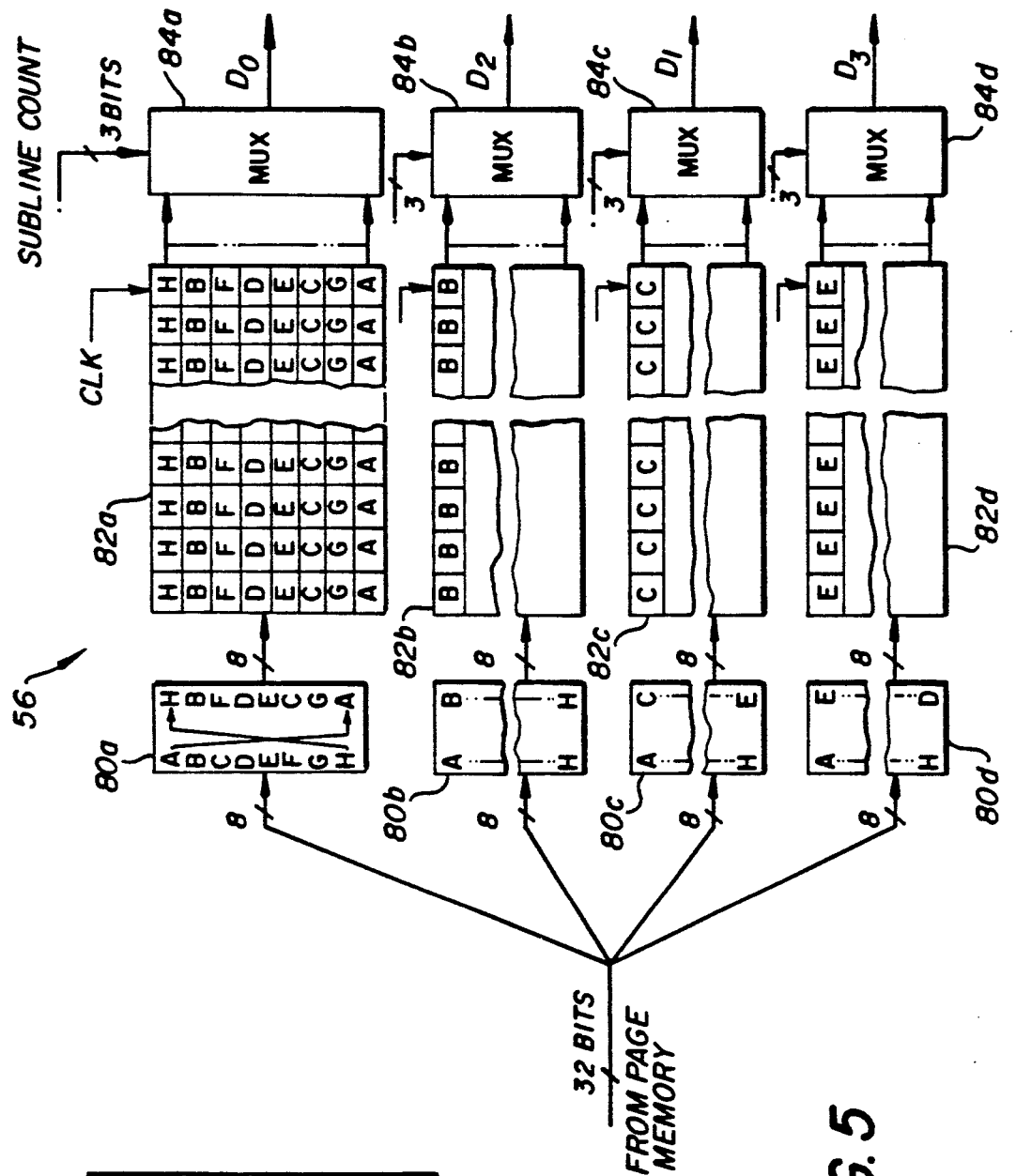
FIG. 5 is a block diagram of a circuit for formatting data to the printhead of FIG. 3 for operation in accordance with the invention.

With reference now to FIG. 5, the LCU may be programmed to remove rasterized data from the page memory by "pulling" four eight-bit words at a time representing grey level data for four pixels. The four pixels are associated with four independent segments of the LED printhead that are served by the four data lines $D_0$–$D_3$. For example, the four segments of the printhead may comprise the even-numbered LED's 0–2430 of a first half of the printhead, the odd-numbered LED's 1–2431 of the first half of the printhead, the even-numbered LED's 2432–4862 of the second half of the printhead and the odd-numbered LED's 2433–4863 of the second half of the printhead. This 32-bit word is then divided into its 8-bit components and reformatted such as by a hardwired arrangement 80a–d to arrange the data for acceptance by multibit shift registers 82a–d in the proper format for shifting to the shift registers on the printhead. In the table of FIG. 5, letters A–H represent the time duration weighting of the data bits with the exposure times indicated. With reference to FIGS. 4a–4d, it may be seen that for sub-line #1, all the even-numbered LED's in the first half of the printhead are to be enabled for 100 μs if their data bit indicates they are to be enabled for this period. Thus, as shown in register 82a in the first row there are 1216 data bits H to be shifted to serial register 22a (FIG. 3); these data bits are each a binary 1 or 0 indicating whether or not the respective LED is to be enabled for 100 μs. Similarly, as may be seen in FIG. 4c on enable line 0 the next enable pulse for sub-line #2 is 2.35 μs indicated by the letter B. As may be noted in FIG. 5, in the second row of shift register 82a there is stored the 1216 data bits B for the even numbered LED's in the first half of the printhead and for printing the sub-line #2. Multiplexers 84a–d are responsive to a sub-line count signal from the LCU for selecting the output from the appropriate row of each respective shift register 82a–d. The multibit shift registers for lines $D_0$–$D_3$ have their data formatted in the order suitable for exposure in accordance with the timing diagrams of FIGS. 4a–4d.

This data is carried over lines, indicated in FIG. 3 by lines $D_0$–$D_3$, and is fed under clock control to an appropriate serial data shift register 22a, 22b, 22c and 22d until 4864 bits of data, one for each of the LED's, is stored in the serial registers for the odd and even numbered LED's. Upon a latch enable (LEN) signal from the LCU, the data is shifted in parallel to latch registers 24a, 24b, 24c and 24d enabling the next sub-line of data to be introduced into the serial shift registers. In response to an encoder pulse or other suitable pulse indicating the timing for firing the next sub-line for printing, the LCU provides a series of timed strobe signals.

The strobe signals are provided by the LCU over the enable lines 0–3 as shown in FIGS. 4a–4d. It will be noted from these timing diagrams that relatively long pulses such as the 100 μs pulse on enable line #0 (sub-line 1) are followed by shorter duration pulses on enable lines 1–3 during sub-line #1. It may be noted that the exposure duration for each sub-line is kept relatively short by arranging the series of strobe pulses so that the longest pulse on each sub-line is greater than the sum of the pulses on these other enable lines for that sub-line period. Although this relationship of exposure times is not necessary to practice the invention, it provides the most effective way to use the line time available for exposure to minimize current requirements. It may also be noted that the pulse durations are generally binary weighted with the lower exposure durations being increased to avoid exposure times that are too short for activating LED's which have minimum rise time and fall time requirements.

One preferred arrangement of order of the strobe signals on enable lines #0–3 is to enable the even-numbered LED's on the first half of the printhead, then the even-numbered LED's on the second half of the printhead, then the odd-numbered LED's on the first half of the printhead and then the odd-numbered LED's on the second half of the printhead. Heating of the printer due to current pulsing of the LED's is minimized with this arrangement. In addition, the straightness of a printed line in the cross-track (main scanning) direction can be ensured since there will only be 1/2400" separation between a line of recorded sub-pixels formed in one-half of the printhead versus a line of sub-pixels recorded in a second half of the printhead. Furthermore, the order of the sub-line exposures as indicated in FIGS. 4a–4d, both for exposures in the in-track direction (successive exposures by one LED using say enable line #0) and cross-track direction will help the sub-pixels' process stability by intermixing high exposure sub-pixels with low exposure sub-pixels adjacent to it.

The enable lines 0–3 are fed to one input of a respective logic AND gate 26 associated with each LED. The other input of AND gate 26 is provided with a data bit from the latch register representing whether or not a sub-dot or sub-pixel is to be printed at this time. Assuming a sub-dot is to be printed, a respective LED is enabled for a time period predetermined by the strobe signal for that sub-line. In this regard, enablement of an LED 20 comprises driving of current through the LED by for example a transistor controlled current driver 99 of conventional circuitry to cause the LED to generate illumination.

The invention has been illustrated with regard to a printhead having a plural number N of point-like recording elements (LED's) per inch exemplified by the N=300 dpi printhead described herein and a control for exposing M lines (M=300 dpi) of grey level pixels per inch in the sub-scanning direction by use of L sub-lines, exemplified by L=8, for each grey level pixel. Thus, encoder signals are provided at the rate of 1/2400 per inch (0.01 mm) of travel of the web 12 for recording P=L×M (2400 in this example) sub-lines per inch.

The exposure durations during the sub-lines for recording a grey level pixel are mixed between large and then followed by relatively shorter duration exposures which contribute to electrophotographic process stability. Thermal problems are minimized by reducing current requirements to the printhead through staggering of the enablement times during each sub-line exposure period. The duration of each sub-line exposure period is kept uniform to simplify the clocking of data to the printhead yet the duration of each sub-line exposure period is of relatively short duration. The advantages of grey level printing using an inexpensive binary printhead are thus inexpensively and efficiently realized.

The specific exposure times and resolution dimensions identified numerically are provided as exemplary and, of course, may be optimized for the appropriate printhead. Exposure correction to compensate for non-uniformities in the LED's or drivers may be accomplished through modifying of data for each LED at each grey level. The advantages of process stability are attained even where the exposures for the sub-lines are concurrent.

While the invention has been illustrated in connection with an electrophotographic apparatus, other non-impact dot matrix printers such as thermal, electrographic, etc. may also make use of the invention described herein.

The encoder means may be of the type described herein, wherein each line of printing is "tracked" relative to actual photoconductor movement or wherein an encoder signal is "tracked" at the beginning of each frame and pulses artificially created for each line in accordance with approximate photoconductor movement.

The invention has been described in detail with particular reference to preferred embodiments thereof, but it will be understood that variations and modifications can be effected within the spirit and scope of the invention.

What is claimed is:

1. A non-impact recording apparatus comprising:
   a binary architectured printhead including
   a) a plurality of recording elements; b) a respective register means associated with each recording element for storing a single image data bit and cooperating in activating a respective recording element for a predetermined enablement time as determined by a strobe pulse;
   c) means including a plurality of independent enable lines for carrying a plurality of strobe timing pulses;
   d) an enabling means for enabling a recording element in response to a data bit stored in a respective register means and to a strobe timing pulse;
   e) means for coupling a plurality of recording elements to one of said enable lines and a different plurality of recording elements to another one of said enable lines; and
   f) driving means for driving said binary architectured printhead to record grey level pixels using plural sub-lines to record each grey level pixel; said driving means including
   a) means for generating a new set of sub-line binary data signals for each sub-line of recording and for conveying such signals to the printhead for storing in a plurality of respective register means; and
   b) means for generating on each enable line a repeating series of strobe timing pulses, the series of pulses being a set of timing pulses of different durations for use in recording a grey level pixel, a pulse from the set of timing pulses being generated during a sub-line exposure period on each enable line and each enable line having a pulse from said set of timing pulses generated thereon that is a different duration that that generated on another enable line during said sub-line recording period and wherein during a sub-line exposure period pulses on the enable lines are substantially nonconcurrent.

2. The apparatus of claim 1 and wherein durations of the strobe pulses in the set are relatively binary weighted in time.

3. The apparatus of claims 1 or 2 and wherein a sum of strobe pulse durations on three of the enable lines during a sub-line recording period is less than a duration of a strobe pulse on a fourth enabling line during said period.

4. The apparatus of claim 3 and wherein the recording elements are light-emitting diodes.

5. The apparatus of claims 1 or 2 and wherein there are a plural number N of recording elements per inch in a main scanning direction and control means are provided for moving a recording medium relative to said recording elements for generating new sub-lines of data for recording on said recording medium at a rate of P sub-lines per inch, wherein P is larger than N.

6. The apparatus of claim 5 and wherein the recording elements are light-emitting diodes.

7. A non-impact recording apparatus comprising:
   a) a plurality of recording elements arranged in a single row with odd and even-numbered recording elements alternating in the row;
   b) means for providing image data signals for use in enabling a recording element to record;
   c) logic means for combining an image data signal and a strobe signal for causing a recording element to be enabled for recording; and
   d) control means for providing strobe signals for use in enabling the recording elements to record for predetermined periods of time, the strobe signals, during recording of a line in a main scan direction of the recording elements, including for each recording element a set of plural different time periods wherein a recording element is enabled by the logic means for such set of periods in a predetermined order in recording of a pixel and wherein strobe signals for odd and even-numbered recording elements occur at different times so as to substantially not overlap in time and adjacent recording elements are enabled for different periods from said set during recording of a sub-line of said line.

8. The apparatus of claim 1, 2 or 7 and wherein the recording elements are light-emitting diodes.

* * * * *